(12) United States Patent
Eastman et al.

(10) Patent No.: US 10,744,355 B2
(45) Date of Patent: Aug. 18, 2020

(54) HEAT RESISTANT SYSTEMS AND METHODS

(71) Applicant: GOODRICH CORPORATION, Charlotte, NC (US)

(72) Inventors: Scott Alan Eastman, Glastonbury, CT (US); Michael Paul Humbert, Wethersfield, CT (US); Steven W. Gronda, Feeding Hills, MA (US); Zhongfen Ding, South Windsor, CT (US); Christopher L. Chapman, Lanesville, IN (US); Farzana Hussain, Prospect, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 536 days.

(21) Appl. No.: 15/473,212

(22) Filed: Mar. 29, 2017

(65) Prior Publication Data
US 2018/0280741 A1 Oct. 4, 2018

(51) Int. Cl.
*A62C 2/06* (2006.01)
*B64C 1/06* (2006.01)
*C09K 21/00* (2006.01)

(52) U.S. Cl.
CPC .............. *A62C 2/065* (2013.01); *B64C 1/066* (2013.01); *C09K 21/00* (2013.01)

(58) Field of Classification Search
CPC .......... A62C 2/065; C09K 21/00; B64C 1/066
See application file for complete search history.

(56) References Cited

U.S. PATENT DOCUMENTS

| | | | |
|---|---|---|---|
| 4,371,579 A | 2/1983 | Mccaskey | |
| 4,861,643 A | 8/1989 | Scollard | |
| 4,930,276 A * | 6/1990 | Bawa | E06B 5/162 |
| | | | 52/208 |
| 6,951,162 B1 | 10/2005 | Shockey et al. | |
| 7,323,248 B2 | 1/2008 | Ramsey | |
| 7,622,518 B2 | 11/2009 | Williams et al. | |
| 7,928,160 B2 | 4/2011 | Senkfor et al. | |
| 8,083,878 B1 | 12/2011 | Booth et al. | |
| 8,535,578 B2 | 9/2013 | Hansel et al. | |
| 8,808,850 B2 | 8/2014 | Dion et al. | |
| 8,974,911 B2 * | 3/2015 | Nolte | B05D 7/57 |
| | | | 427/384 |
| 9,034,221 B2 * | 5/2015 | Kozlowski | C08K 5/5205 |
| | | | 252/601 |
| 9,085,678 B2 | 7/2015 | Basfar et al. | |

(Continued)

FOREIGN PATENT DOCUMENTS

| EP | 1871579 | 6/2011 |
|---|---|---|
| EP | 2746045 | 7/2016 |

(Continued)

OTHER PUBLICATIONS

U.S. Appl. No. 15/430,073, filed Feb. 10, 2017 entitled "Heat Resistant Systems and Methods for Composite Structures".

(Continued)

*Primary Examiner* — Valentina Xavier
(74) *Attorney, Agent, or Firm* — Snell & Wilmer L.L.P.

(57) ABSTRACT

A veneer panel may comprise an outer surface, and a heat resistant system coupled to the outer surface comprising at least one of a thermal barrier layer or an intumescent layer.

12 Claims, 3 Drawing Sheets

(56) References Cited

U.S. PATENT DOCUMENTS

| | | |
|---|---|---|
| 9,150,757 B2 | 10/2015 | Massingill, Jr. et al. |
| 2007/0194172 A1 | 8/2007 | Luce et al. |
| 2008/0063875 A1* | 3/2008 | Robinson .................. B32B 1/08 |
| | | 428/426 |
| 2009/0162556 A1* | 6/2009 | Boutwell .............. C23C 28/042 |
| | | 427/383.1 |
| 2010/0330282 A1* | 12/2010 | Nienburg .............. C23C 24/082 |
| | | 427/292 |
| 2011/0070410 A1* | 3/2011 | Huang .................... B32B 17/02 |
| | | 428/195.1 |
| 2011/0114342 A1* | 5/2011 | Ono ....................... A62C 2/065 |
| | | 169/45 |
| 2012/0148824 A1 | 6/2012 | Martin et al. |
| 2015/0140306 A1 | 5/2015 | Endo et al. |
| 2015/0190987 A1* | 7/2015 | Gonzalez-Garcia ......................... |
| | | B32B 27/065 |
| | | 428/319.7 |
| 2016/0340588 A1 | 11/2016 | Bauer et al. |
| 2017/0050417 A1 | 2/2017 | St. Rock et al. |
| 2017/0121982 A1* | 5/2017 | Bischel ................... B32B 15/20 |
| 2018/0229832 A1* | 8/2018 | Eastman ................. B32B 27/40 |
| 2018/0280741 A1 | 10/2018 | Eastman |

FOREIGN PATENT DOCUMENTS

| | | |
|---|---|---|
| JP | 2007254718 | 10/2007 |
| JP | 2011120574 | 6/2011 |
| JP | 2011129754 | 6/2011 |
| WO | 2016143371 | 9/2016 |

OTHER PUBLICATIONS

European Patent Office, European Search Report dated Jun. 14, 2018 in Application No. 18154437.0-1107.

USPTO; Pre-Interview First Office Action dated Apr. 9, 2018 in U.S. Appl. No. 15/430,073.

USPTO; Non-Final Office Action dated Dec. 11, 2018 in U.S. Appl. No. 15/430,073.

USPTO; Non-Final Office Action dated Jun. 20, 2019 in U.S. Appl. No. 15/430,073.

* cited by examiner

HEAT RESISTANT SYSTEMS AND METHODS

FIELD

This disclosure generally relates to providing heat protection to panel structures.

BACKGROUND

Interior designs of vehicles (e.g., aircraft, boats, or the like) may comprise various aesthetic features in an interior cabin, such as wood veneers. The interiors of such vehicles should be resistant to heat and fire, similar to mechanical and outer portions of the vehicles. Therefore, aesthetic interior features (e.g., wooden veneers) may benefit from being protected from heat exposure such that an interior cabin may resist heat and fire, thus preventing or mitigating injury to occupants.

SUMMARY

In various embodiments, a veneer panel may comprise an outer surface, and a heat resistant system coupled to the outer surface. In various embodiments, the heat resistant system may comprise a thermal barrier layer having a thermal barrier material comprising at least one of montmorillonite, boron nitride, graphene, silicon carbide, graphite, aluminum hydroxide, magnesium hydroxide, silicate glass, mica powder or flake, aluminum oxide powder, titanium dioxide powder, or zirconium oxide powder. In various embodiments, the heat resistant system may comprise an intumescent layer having an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine. In various embodiments, the heat resistant system may comprise a thermal barrier layer having a thermal barrier material comprising at least one of montmorillonite, boron nitride, graphene, silicon carbide, graphite, aluminum hydroxide, magnesium hydroxide, silicate glass, mica powder or flake, aluminum oxide powder, titanium dioxide powder, or zirconium oxide powder; and an intumescent layer having an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

In various embodiments, the thermal barrier layer may further comprise a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the thermal barrier layer comprises between 50% and 99.9% by weight thermal barrier material. In various embodiments, the intumescent layer may further comprise a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the intumescent layer comprises between 50% and 99.9% by weight intumescent material.

In various embodiments, the thermal barrier layer may further comprise an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine. In various embodiments, the thermal barrier layer may comprise between 50% and 99.9% by weight thermal barrier layer and intumescent material, collectively.

In various embodiments, an interior cabin of a vehicle may comprise a veneer panel having an outer surface, and a heat resistant system coupled to the outer surface. In various embodiments, the heat resistant system may comprise a thermal barrier layer having a thermal barrier material comprising at least one of montmorillonite, boron nitride, graphene, silicon carbide, graphite, aluminum hydroxide, magnesium hydroxide, silicate glass, mica powder or flake, aluminum oxide powder, titanium dioxide powder, or zirconium oxide powder. In various embodiments, the heat resistant system may comprise an intumescent layer having an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine. In various embodiments, the heat resistant system may comprise a thermal barrier layer having a thermal barrier material comprising at least one of montmorillonite, boron nitride, graphene, silicon carbide, graphite, aluminum hydroxide, magnesium hydroxide, silicate glass, mica powder or flake, aluminum oxide powder, titanium dioxide powder, or zirconium oxide powder; and an intumescent layer having an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

In various embodiments, the thermal barrier layer may further comprise a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the thermal barrier layer comprises between 50% and 99.9% by weight thermal barrier material. In various embodiments, the intumescent layer may further comprise a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the intumescent layer comprises between 50% and 99.9% by weight intumescent material.

In various embodiments, the thermal barrier layer may further comprise an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine. In various embodiments, the thermal barrier layer may comprise between 50% and 99.9% by weight thermal barrier layer and intumescent material, collectively.

In various embodiments, a method may comprise forming a heat resistant slurry; applying the heat resistant slurry to an outer surface of a veneer panel; and forming a heat resistant system on the outer surface. In various embodiments, the forming the heat resistant slurry may comprise forming a thermal barrier slurry by combining a thermal barrier material, a first binder, and a first solvent, wherein the thermal barrier material may comprise at least one of montmorillonite, boron nitride, graphene, silicon carbide, graphite, aluminum hydroxide, magnesium hydroxide, silicate glass, mica powder or flake, aluminum oxide powder, titanium dioxide powder, or zirconium oxide powder. Applying the heat resistant slurry may comprise applying the thermal barrier slurry to the outer surface. Forming a heat resistant system may comprise forming a thermal barrier layer.

In various embodiments, forming a heat resistant slurry may comprise forming an intumescent slurry by combining an intumescent material, a first binder, and a first solvent, wherein the intumescent material may comprise at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine; wherein applying the heat resistant slurry comprises applying the intumescent slurry to the outer surface; and wherein forming a heat resistant system comprises forming an intumescent layer.

In various embodiments, forming the thermal barrier slurry may further comprise combining a second intumescent material with the thermal barrier material, the first binder, and the first solvent, wherein the second intumescent material may comprise at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1A:
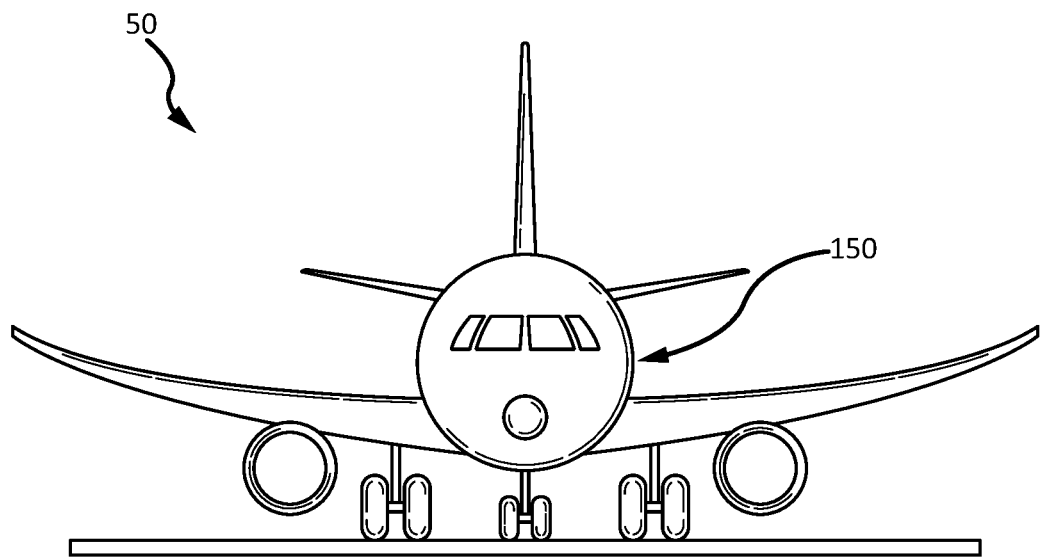
FIG. 1A illustrates a perspective view of an aircraft, in accordance with various embodiments.
Figure 1B:
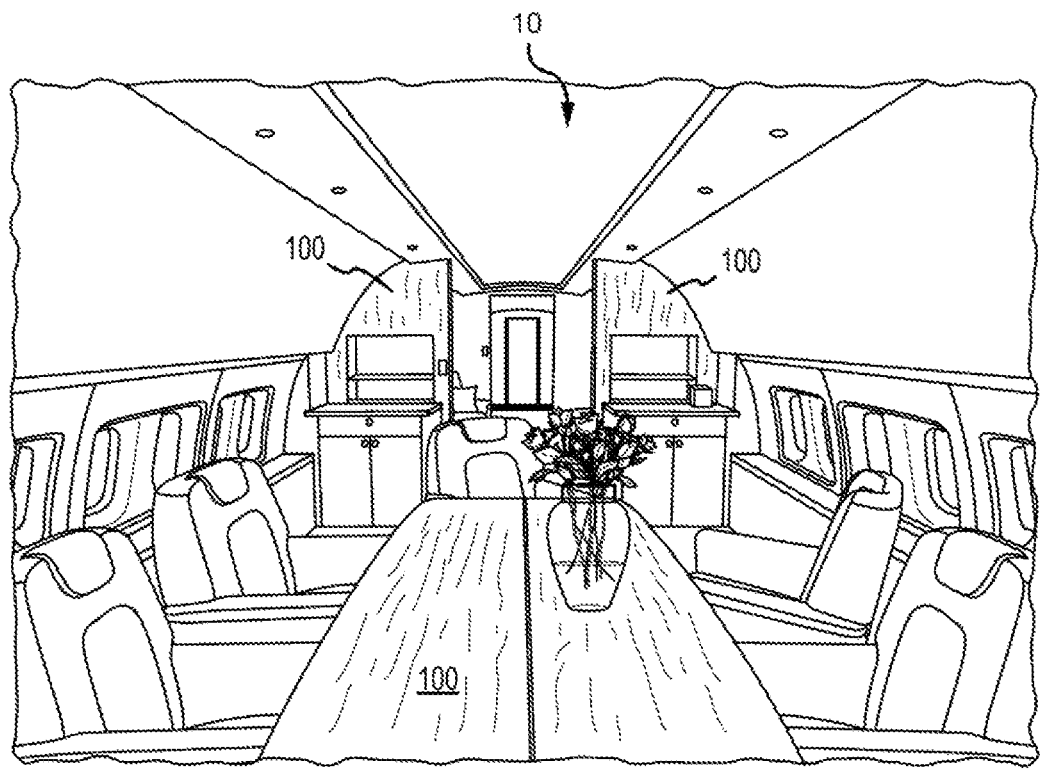
FIG. 1B illustrates a perspective view of an aircraft interior, in accordance with various embodiments.

Aircraft, such as aircraft 50 depicted in FIG. 1A, may comprise an interior cabin inside aircraft body 150. FIG. 1B depicts an interior cabin 10 inside an aircraft (e.g., aircraft 50) including various elements comprising veneer panels 100, in accordance with various embodiments. Other vehicles, such as automobiles and boats, may comprise the same or similar veneers in an interior compartment. Veneer panels 100 may be cut from wood logs, or may be designed to look like wood, having aesthetically pleasing wood grain patterns. Such veneers panels should be heat and fire resistant so as to prevent or help suppress a fire in interior cabin 10 of aircraft 50.

Figure 2A:
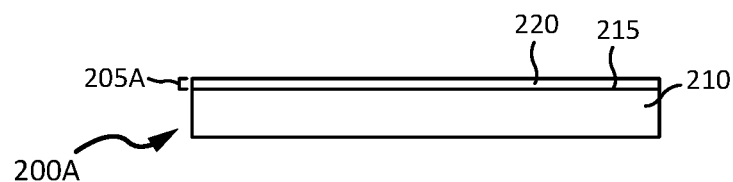
FIGS. 2A, 2B, and 2C illustrate cross sectional views of veneer panels having external heat resistant system(s), in accordance with various embodiments.

With reference to FIG. 2A, a cross section of a veneer panel 200A having a veneer face panel 210 is depicted, in accordance with various embodiments. Veneer face panel 210 may comprise a heat resistant system 205A disposed on and coupled to an outer surface 215 of veneer face panel 210. In various embodiments, outer surface 215 may be the surface presented to viewers of veneer face panel 210. Therefore, outer surface 215 may have a wood grain pattern.

In various embodiments, heat resistant system 205A may comprise a first layer 220 disposed on and coupled to outer surface 215. First layer 220 may be a thermal barrier layer comprising a thermal barrier material. The thermal barrier material may be a material having low thermal conductivity (e.g., less than 2 watts per meter per degree Celsius, or less than 1 watt per meter per degree Celsius, or less than 0.5 watt per meter per degree Celsius), and may be otherwise resistant and/or reluctant to participate in a combustion reaction (i.e., thermal barrier materials resist burning). In various embodiments, the thermal barrier material may comprise at least one of a clay (e.g., montmorillonite, which may refer to hydrated sodium calcium aluminium magnesium silicate hydroxide, which may be represented as $(Na,Ca)_{0.33}(Al,Mg)_2(Si_4O_{10})(OH)_2 \cdot nH_2O$), boron nitride, graphene, silicon carbide, graphite, aluminum hydroxide, magnesium hydroxide, silicate glass, mica powder or flake, aluminum oxide powder, titanium dioxide powder, or zirconium oxide powder.

In various embodiments, the thermal barrier layer may comprise a binder comprising at least one of polyvinyl alcohol, polyvinyl alcohol copolyacetate, polyacrylamide, polyethylene glycol, polyethylenimine, polyvinyl acetate, polyurethane, polyester, or latex. The thermal barrier layer may comprise between 40% and 100% by weight thermal barrier material, between 50% and 99.9% by weight thermal barrier material, between 60% and 90% by weight thermal barrier material, or between 70% and 80% by weight thermal barrier material. The thermal barrier layer may comprise between 0% and 60% by weight binder, between 0.01% and 50% by weight binder, between 10% and 40% by weight binder, or between 20% and 30% by weight binder. The weight percent, as used in this context, means the weight of the subject material (e.g., the thermal barrier material or the binder) over the total weight of the thermal barrier layer.

In various embodiments, the thermal barrier layer may further comprise an intumescent material. The intumescent material may be a material that reacts in response to combusting or thermally degrading to form a char, foam, or other volatile fire-suppressing species. Therefore, the intumescent layer may be configured to suppress heat or flame in response to the intumescent combusting or thermally degrading. The intumescent material may comprise any suitable material, such as various nitrogen and/or phosphorus-comprising materials. For example, the intumescent material may comprise at least one of polyethylenimine, ammonium phosphate, aluminum phosphate, pentaerythritol, hexametaphosphate, chitosan, melamine cyanurate, melamine phosphate, a phosphonate oligomer, an amino saccharide (e.g., cellulose), or an ionic liquid comprising at least one of imidazole or pyridine. In such embodiments, the thermal barrier layer may comprise between 20% and 99.9% by weight, between 50% and 99.9% by weight, between 60% and 90% by weight, or between 70% and 80% by weight the thermal barrier material and the intumescent material, collectively. In other words, the thermal barrier material and the intumescent material, collectively, may make up between 20% and 99.9% by weight, between 50% and 99.9% by weight, between 60% and 90% by weight, or between 70% and 80% by weight of the thermal barrier layer. In various embodiments, the thermal barrier layer may have a thickness of between 10 nanometers (nm) ($3.9*10^{-7}$ inch) and 500 micrometers (μm) (0.02 inch), between 50 nm ($2.0*10^{-6}$ inch) and 300 nm ($1.2*10^{-5}$ inch), or between 50 μm (0.002 inch) and 200 μm (0.008 inch).

In various embodiments, first layer 205 may be an intumescent layer comprising an intumescent material. In various embodiments, the intumescent material may comprise at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

In various embodiments, the intumescent layer may comprise a binder comprising at least one of polyvinyl alcohol, polyvinyl alcohol copolyacetate, polyacrylamide, polyethylene glycol, polyethylenimine, polyvinyl acetate, polyurethane, polyester, or latex. The intumescent layer may comprise between 20% and 99.9% by weight intumescent material, between 50% and 99.9% by weight intumescent material, between 60% and 90% by weight intumescent material, or between 70% and 80% by weight intumescent material. The intumescent layer may comprise between 0.01% and 80% by weight binder, between 0.01% and 50% by weight binder, between 10% and 40% by weight binder, or between 20% and 30% by weight binder. The weight percent, as used in this context, means the weight of the subject material (e.g., the thermal barrier material or the binder) over the total weight of the intumescent layer. In various embodiments, the intumescent layer may have a thickness of between 10 nanometer (nm) ($3.9*10^{-7}$ inch) and 500 micrometers (μm) (0.02 inch) or between 50 nm ($2.0*10^{-6}$ inch) and 1000 nm ($3.9*10^{-5}$ inch).

Figure 2B:
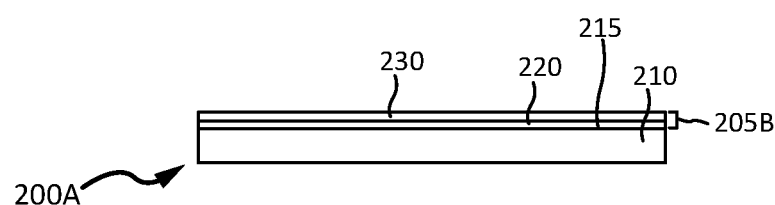

In various embodiments, with additional reference to FIG. 2B, a heat resistant system 205B on outer surface of 215 of veneer face panel 210 may comprise a second layer 230 disposed on first layer 220. In various embodiments, second layer 230 may be an intumescent layer, as described herein in relation to first layer 220. In various embodiments, second layer 230 may be a thermal barrier layer, as described herein in relation to first layer 220. In various embodiments, there may be any desired number of layers in a heat resistant system such as heat resistant system 205B, and each layer may comprise a thermal barrier layer and/or intumescent layer.

Figure 2C:
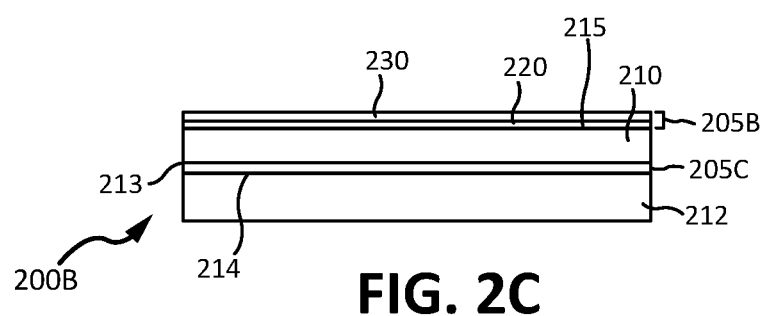

In various embodiments, with reference to FIG. 2C, a veneer panel 200B may comprise additional panels coupled to face panel 210, such as internal panel 212. Internal panel may be comprised of the same or different material as face panel 210, and may be configured to provide structural strength and/or stability to the veneer. In various embodiments, an adhesive layer 213 may be disposed between face panel 210 and internal panel 212 configured to couple internal panel 212 to face panel 210. In various embodiments, adhesive layer 213 may comprise any suitable adhesive to couple face panel 210 to internal panel 212 (e.g., polyvinyl alcohol, wet glue, thermoplastic materials, dry adhesive thermoplastic materials, nitro phenolic glue, phenolic glue film, or the like). In various embodiments, adhesive layer 213 may comprise an thermal barrier material, such as clay (e.g., montmorillonite) and/or any of the other thermal barrier materials discussed herein.

In various embodiments, internal panel 212 may comprise a bonding surface 214. The bonding surface may be directly coupled to face panel 210 via adhesive layer 213. In various embodiments, a heat resistant system 205C may be coupled to bonding surface 214 of internal panel 212, and disposed between internal panel 212 and face panel 210. Heat resistant system 205C may comprise a first layer (similar to heat resistant system 205A in FIG. 2A), or a first layer and a second layer (similar to heat resistant system 205B in FIG. 2B). A first layer and/or a second layer in heat resistant system 205C may be a thermal barrier layer or an intumescent layer, as described herein in relation to heat resistant system 205A in FIGS. 2A and 2B. Internal panel 212 having heat resistant system 205C may provide further protection for the veneer against heat and/or fire.

Figure 3:
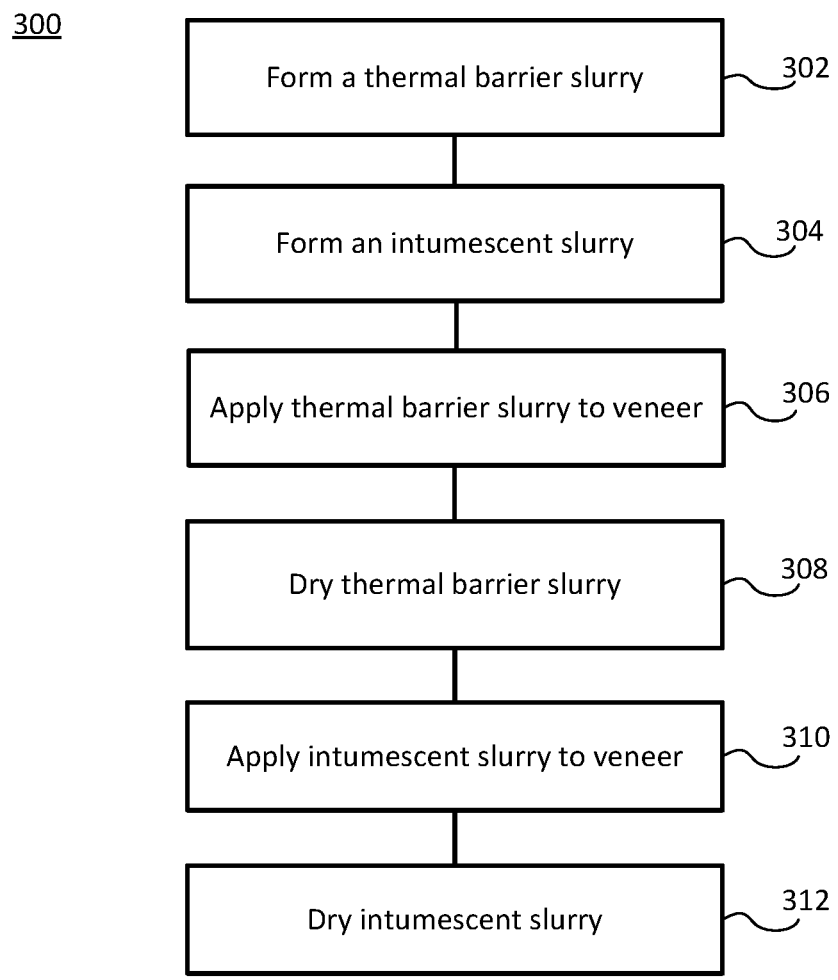
FIG. 3 illustrates a method for forming a heat resistant system on a veneer panel, in accordance with various embodiments.

FIG. 3 depicts a method 300 for forming a heat resistant system on a veneer panel, in accordance with various embodiments. In various embodiments, a heat resistant slurry may be formed. In various embodiments, forming the heat resistant slurry may comprise forming a thermal barrier slurry (step 302) by combining a binder and a thermal barrier material in a solvent (e.g., water). The binder and the thermal barrier material may be any of the materials discussed herein. In various embodiments, an intumescent material may be combined with the thermal barrier material, binder, and a solvent to form the thermal barrier slurry. The intumescent material may be any of the materials discussed herein.

In various embodiments, forming the heat resistant slurry may comprise forming an intumescent slurry (step 304) by combining a binder and an intumescent material in a solvent (e.g., water). The binder and the intumescent material may be any of the materials discussed herein.

With combined reference to FIGS. 2A, 2B, and 3, in various embodiments, the thermal barrier slurry may be applied to a veneer (step 306), such as on an outer surface 215 of a face panel 210 of a veneer. The application of the thermal barrier slurry may be completed, for example, by brushing, spraying, and/or blade coating the thermal barrier slurry onto outer surface 215 of face panel 210, and/or by dipping outer surface 215 into the thermal barrier slurry. After applying the thermal barrier slurry to outer surface 215, the thermal barrier slurry may be dried (step 308) to form a thermal barrier layer (which may be first layer 220). Drying may occur by air drying or placing face panel 210 into an oven and heated for a suitable period of time. In various embodiments, as described herein, the thermal barrier layer may be the only layer in the heat resistant system (e.g., heat resistant system 205A).

In various embodiments, the intumescent slurry may be applied to the veneer (step 310). In various embodiments, the intumescent slurry may be applied directly to outer surface 215, or to the first layer 220 after being dried (which may be a thermal barrier layer). The intumescent slurry may be dried (step 312) (e.g., by air drying or heating in an oven), thereby forming an intumescent layer. The intumescent layer may be first layer 220 and/or second layer 230. In various embodiments, steps 306 and 308, and/or steps 310 and 312, may be repeated to from as many layers in a heat resistant system as desired.

In various embodiments, steps 306 and 308, and/or steps 310 and 312, may be performed on face panel 210, as described herein, and/or on an internal panel 212 to provide additional heat/fire protection for a veneer. Face panel 210 and any additional panels (e.g., internal panel 212) may be coupled via an adhesive, as described herein, to form the veneer.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A veneer panel, comprising:
   an outer surface comprising at least one of wood and a wood grain pattern; and
   a heat resistant system disposed on and coupled to the outer surface,
   wherein the heat resistant system comprises a thermal barrier layer disposed on the outer surface and an intumescent layer disposed on the thermal barrier layer,
   wherein the thermal barrier layer comprises a thermal barrier material comprising at least one of montmorillonite, boron nitride, graphene, silicon carbide, graphite, aluminum hydroxide, magnesium hydroxide, mica powder or flake, aluminum oxide powder, titanium dioxide powder, or zirconium oxide powder, and
   wherein the intumescent layer comprises an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

2. The veneer panel of claim 1, wherein the thermal barrier layer further comprises a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the thermal barrier layer comprises between 50% and 99.9% by weight thermal barrier material.

3. The veneer panel of claim 1, wherein the intumescent layer further comprises a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the intumescent layer comprises between 50% and 99.9% by weight intumescent material.

4. The veneer panel of claim 1, wherein the thermal barrier layer further comprises an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

5. The veneer panel of claim 4, wherein the thermal barrier layer comprises between 50% and 99.9% by weight the thermal barrier layer and the intumescent material, collectively.

6. An interior cabin of a vehicle, comprising:
   a veneer panel having an outer surface comprising at least one of wood and a wood grain pattern; and
   a heat resistant system disposed on and coupled to the outer surface,
   wherein the heat resistant system comprises a thermal barrier layer disposed on the outer surface and an intumescent layer disposed on the thermal barrier layer,
   wherein the thermal barrier layer comprises a thermal barrier material comprising at least one of montmorillonite, boron nitride, graphene, graphite, aluminum hydroxide, magnesium hydroxide, mica powder or flake, aluminum oxide powder, titanium dioxide powder, or zirconium oxide powder, and wherein the intumescent layer comprises an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

7. The interior cabin of claim 6, wherein the thermal barrier layer further comprises a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the thermal barrier layer comprises between 50% and 99.9% by weight thermal barrier material.

8. The interior cabin of claim 6, wherein the intumescent layer further comprises a binder comprising at least one of polyvinyl alcohol, polyvinyl alcohol copolyacetate, polyacrylamide, polyethylene glycol, polyethylenimine, polyvinyl acetate, polyurethane, polyester, or latex, wherein the intumescent layer comprises between 50% and 99.9% by weight intumescent material.

9. The interior cabin of claim 6, wherein the thermal barrier layer further comprises an intumescent material comprising at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

10. The interior cabin of claim 9, wherein the thermal barrier layer comprises between 50% and 99.9% by weight the thermal barrier layer and the intumescent material, collectively.

11. A method comprising:
forming a thermal barrier slurry by combining a thermal barrier material, a first binder, and a solvent, wherein the thermal barrier material comprises at least one of montmorillonite, boron nitride, graphene, graphite, aluminum hydroxide, magnesium hydroxide, mica powder or flake, aluminum oxide powder, titanium dioxide powder, or zirconium oxide powder;
applying the thermal barrier to an outer surface of a veneer panel comprising at least one of wood and a wood grain pattern;
forming a system thermal barrier layer on the outer surface;
forming an intumescent slurry by combining an intumescent material, a second binder, and a second solvent, wherein the intumescent material comprises at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine;
applying the intumescent slurry to the thermal barrier layer; and
forming an intumescent layer on the thermal barrier layer.

12. The method of claim 11, wherein the forming the thermal barrier slurry further comprises combining a second intumescent material with the thermal barrier material, the first binder, and the first solvent, wherein the second intumescent material comprises at least one of polyethylenimine, ammonium phosphate, aluminum phosphate, pentaerythritol, hexametaphosphate, chitosan, melamine cyanurate, melamine phosphate, a phosphonate oligomer, an amino saccharide, or an ionic liquid comprising at least one of imidazole or pyridine.

\* \* \* \* \*